United States Patent [19]

Parish

[11] Patent Number: 4,477,620

[45] Date of Patent: Oct. 16, 1984

[54] POLYIMIDE FILM

[75] Inventor: Darrell J. Parish, Stoutsville, Ohio

[73] Assignee: E. I. Du Pont de Nemours and Company, Wilmington, Del.

[21] Appl. No.: 585,459

[22] Filed: Mar. 2, 1984

[51] Int. Cl.³ .................................................. C08K 3/30
[52] U.S. Cl. ..................................... 524/423; 524/606
[58] Field of Search ........................................... 524/423

[56] References Cited

U.S. PATENT DOCUMENTS 4,224,214 9/1980 Chen .................................... 524/423
4,410,648 10/1983 Kato et al. ........................... 524/101
4,419,472 12/1983 Berner et al. ........................ 524/102

FOREIGN PATENT DOCUMENTS 2251708 10/1974 Fed. Rep. of Germany ...... 524/423
54-8649 1/1979 Japan .................................... 524/423

Primary Examiner—Lewis T. Jacobs

[57] ABSTRACT

A shaped polyimide article is disclosed having finely divided barium sulfate as an additive which lowers the limiting oxygen index in combustion and substantially eliminates ash as a combustion product.

9 Claims, No Drawings

POLYIMIDE FILM

BACKGROUND OF THE INVENTION

Polyimide film and sheet materials are well known and have long been used in applications requiring high temperature stability. Polyimide has proven itself to be chemically stable at high temperatures and in a variety of hostile atmospheres and environments. Films and sheets of polyimide have found wide acceptance in electrical and electronic applications, especially in applications wherein the polyimide will not be burned or, if burned, the presence of ash will not be detrimental.

The present invention provides an improved polyimide exhibiting most qualities of the polyimide of the prior art substantially unchanged and, also, exhibiting a uniform combustion front in an oxygen-rich atmosphere resulting in substantially ash-free combustion products.

DESCRIPTION OF THE PRIOR ART

Films and sheets of polyimide material have long been known. A variety of additives has, also, been disclosed as useful in polyimide films and sheets. For instance, U.S. Pat. No. 3,287,311 discloses the use of particulate dielectric additives, specifically, titania, barium and potassium titanate, magnesium sulfate, asbestos, ferrous and ferric oxide, potassium and sodium tartrate, ammonium hydrogen phosphate, alumina, silica and the like. U.S. Pat. No. 3,295,940 discloses abrasive additives, specifically, green rouge, silica, alumina, boron carbide, silicon carbide, steel, diamond and the like. U.S. Pat. No. 3,356,759 discloses the use of particulate inert lubricant additives, specifically, polyhalocarbon resins such as polytetrafluoroethylene, polychlorotrifluoroethylene, and the like. Canadian Pat. No. 708,896 discloses electrically conductive additives such as carbon black.

DESCRIPTION OF THE INVENTION

According to the present invention there is provided a shaped article comprising a continuous matrix of polyimide and a finelydivided, particulate, barium sulfate additive distributed substantially homogeneously throughout. The shaped article of the present invention can be in any form but is most usually in the form of sheets or thin film, either as a web of indefinite length or cut off. The shaped articles of this invention will, therefore, most often be termed a film or sheet herein.

The barium sulfate additive is used in the article of this invention because it has been discovered that barium sulfate alters the combustion characteristics of polyimide material in a way heretofore unknown. The barium sulfate can be used in concentrations of from 0.1 to 10 weight percent based on total weight of the shaped article; and is preferably used in concentrations of about 0.2 to 2.0 weight percent on that basis. As the concentration of barium sulfate is decreased, the degree of benefit is, of course, decreased. As the concentration of barium sulfate is increased, the presence of the barium sulfate has an increased influence on the physical properties of the polyimide shape article. At concentrations of greater than about 2 weight percent, the optics are adversely affected and at concentrations of greater than about 4 weight percent, the tensile and electrical properties are altered. Generally, more than about 4 weight percent barium sulfate should not be used.

The barium sulfate additive is generally used in a finelydivided particulate form. As previously stated, barium sulfate is used primarily as an additive herein for the alterations which it causes in the combustion characteristics of a polyimide matrix. It has been learned that an added benefit can be derived from the use of barium sulfate if the particle size is properly selected and, especially, if the shaped article is a film or sheet. Barium sulfate having a properly selected particle size is useful to improve the handling qualities of films or sheets of polyimide. Finely particulate barium sulfate not only alters the combustion characteristics of the film or sheet; but, also, serves as a slip additive without seriously influencing the optical character or the physical and electrical qualities of the film or sheet.

The average size of barium sulfate particles useful in the practice of this invention is from 0.2 to 20 micrometers but, to obtain the additional benefits in film or sheet of lower coefficient of friction (increased slip) without undue harm to other film qualities, the average barium sulfate particle size should preferably be 1 to 4 micrometers. A barium sulfate concentration of 0.1 to 1.0 weight percent is, also, preferred to obtain the above-mentioned additional benefits.

Polyimide is useful in the articles of this invention independent of the method for making it. Such polyimide is generally the reaction product of a dianhydride and a diamine.

A few of the dianhydrides suitable for use in polyimide manufacture of the present invention include: pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
3,3',4,4'-benzophenone tetracarboxy dianhydride;
2,2-bis(3,4-dicarboxyphenyl) propane dianhydride; ;
bis(3,4-dicarboxyphenyl) sulfone dianhydride;
3,4,9,10-perylene tetracarboxylic dianhydride;
bis(3,4-dicarboxyphenyl) propane dianhydride;
1,1-bis(2,3-dicarboxyphenyl) ethane dianhydride;
1,1-bis(3,4-dicarboxyphenyl) ethane dianhydride;
bis(2,3-dicarboxyphenyl) methane dianhydride;
bis(3,4-dicarboxyphenyl) methane dianhydride;
bis(3,4-dicarboxyphenyl) sulfone dianhydride; and the like.

A few of the diamines suitable for use in polyimide manufacture of the present invention include: 4,4'-diaminodiphenyl propane; 4,4'-diaminodiphenyl methane; benzidine, 3,3'-dichlorobenzidine; 4,4'-diamino diphenyl sulfide; ; 3,3'-diamino diphenyl sulfone; 4,4'-diamino diphenyl sulfone; 4,4'-diamino diphenyl ether; 1,5-diamino naphthalene; 4,4'-diamino diphenyl diethylsilane; 4,4'-diamino diphenyl diphenylsilane; 4,4'-diamino diphenyl ethyl phosphine oxide; 4,4'-diamino diphenyl N-methyl amine; 4,4'-diamino diphenyl N-phenyl amine; and the like.

The polyimide is generally made by preparation of a polyamide acid from the dianhydride and the diamine followed by conversion of the polyamide acid to polyimide by chemical or thermal means. U.S. Pat. No. 3,179,630 discloses conversion by chemical means and U.S. Pat. No. 3,179,634 discloses conversion by thermal means.

The barium sulfate additive is incorporated into the polyimide by being initially dispersed into the polyamide acid or into the dianhydride or the diamine. Once dispersed in a component, the barium sulfate will remain dispersed throughout reaction of the component to completion of the polyimide.

The present invention is an article comprising barium sulfate dispersed in a matrix of polyimide. The invention, and what is believed to provide patentability, is that the barium sulfate additive alters the combustion characteristics of the polyimide. Polyimide with no additive or with other inert additives is capable of combustion in an atmosphere of 35–45 volume percent oxygen in an oxygen and nitrogen atmosphere while polyimide articles of the present invention are capable of combustion in an atmosphere of 26–32 volume percent oxygen in oxygen and nitrogen. More importantly, polyimide with no additive or with other inert additives leaves a charred residue after burning; while polyimide articles of the present invention burn substantially completely leaving little or no residue. This characteristic can be demonstrated by conducting the Limiting Oxygen Index test (LOI) as described hereinbelow.

The polyimide of this invention retains the well known high temperature performance qualities of polyimide without barium sulfate and also exhibits the above-mentioned qualities of LOI and ash-free combustion. Because the polyimide of this invention burns ash-free, there may be reduced tendency for arc tracking through insulative layers of the material. The polyimide of this invention finds particular use in fuses wherein there is a desire to have a combustible material which burns with substantially no ash residue.

Limiting Oxygen Index (LOI) is the designation of a test used to quantify the oxygen content of atmospheres which will support combustion of materials such as the polyimide material of this invention. The LOI is described in the American Society for Testing and Materials Standards and is designated therein as ASTM D-2863-74. The test determines the minimum concentration of oxygen in a mixture of oxygen and nitrogen flowing upward in a test column that will just support combustion under equilibrium conditions of candle-like burning. The LOI may vary slightly depending upon the thickness of the sample—a thicker sample resulting in a slightly hiher LOI. To prepare for the test, a sample of material to be tested is attached to a frame and held vertically in a glass column which is fitted with a gas flame ignition source and means for introduction of an oxygen-nitrogen gas mixture. The sample should be about 140 millimeters long and 52 millimeters wide. An oxygen-nitrogen mixture of predetermined proportions is introduced into the column and is continuously supplied at a flow rate through the column of 4±1 centimeters per second (gas volume flow rate divided by column cross sectional area). To commence the test, the ignition source is applied to the entire top edge of the sample and then the source is removed and the burning of the sample is observed. If more than about 10 centimeters of the sample length burns, the test should be repeated with reduced oxygen in the atmosphere. The test is repeated until the lowest oxygen concentration is found which will support combustion.

Slide angle slip is a measure of the angle at which a specified weight will slide across a surface of the film as prescribed in accordance with the method described in TAPPI, Volume 50, number 1, January 1967. It is generally accepted that the coefficient of friction of the surface being tested can be calculated as the tangent of the slide angle. Slide angle slip is often used to indicate the effectiveness of a slip additive. Lower slide angles indicate more effective slip additives.

DESCRIPTION OF PREFERRED EMBODIMENTS

Example A-Precursor

Preparation of polyamide acid. A solution was made of 20 weight parts of 4,4'-oxydianiline (ODA) and 330 weight parts of N,N'-dimethylacetamide (DMAC); and, over a 20–25 minute period, with agitation and under a nitrogen blanket, 21.8 weight parts of dry pyromellitic dianhydride (PMDA) were added to the solution. During the addition of PMDA, the temperature of the solution was maintained at less than about 60° C. The solution was agitated for about 30 minutes after addition of the PMDA to complete polymerization to the polyamide acid during which time the temperature was permitted to decrease to about 45° C. The solution was stored at about −20° C. until used.

Example B-Comparative

Preparation of polyimide by thermal conversion. Polyamide acid solution, prepared as described in Example A, above, was warmed to about 20°–25° C. and spread onto a glass plate as a wet film about 0.5 millimeter thick. The glass plate and wet film were heated on a hot plate for about 25 minutes at 112±2° C. After the heating, the plate and film were cooled to about 40° C. and the film was stripped from the plate, clamped into a frame to prevent shrinkage, and heated in an oven for about 30 minutes at 310±5° C.

Example C-Comparative

Preparation of polyimide by chemical conversion. Polyamide acid solution, prepared as described in Example A, above, was warmed to about 20°–25° C. and spread onto a glass plate as a wet film about 0.5 millimeter thick. The glass plate and wet film were immersed in a 1:1, by volume, solution of acetic anhydride and beta-picoline for 3–5 minutes at about 20°–25° C.; and the resulting, self-supporting, gel film was removed from the plate, clamped into a frame to prevent shrinkage, and heated in an oven for about 30 minutes at 310±5° C.

EXAMPLE 1

Preparation of polyimide by thermal conversion and having 1 weight percent $BaSO_4$. Polyamide acid was prepared as described in Example A, above, with the exception that 0.8 weight parts of a 52 weight percent slurry of $BaSO_4$ in DMAC was added to the ODA-DMAC solution before addition of the PMDA. The $BaSO_4$ had an average particle size of about 3±1.7 micrometers.

Polyamide acid, as prepared in this Example 1, was used to make polyimide as described in Example B, above.

EXAMPLE 2

Preparation of polyimide by chemical conversion and having 1 weight percent $BaSO_4$. Polyamide acid, as prepared in Example 1, above, was used to make polyimide as described in Example C, above.

EXAMPLE 3

Preparation of polyimide by thermal conversion and having 0.5 weight percent $BaSO_4$. Equal weight parts of polyamide acid as prepared in Example A, above, and in Example 1, above, were combined and used to make polyimide as described in Example B, above.

EXAMPLE 4

Preparation of polyimide by chemical conversion and having 0.5 weight percent $BaSO_4$. The polyamide acid combination of Example 3, above, was used to make polyimide as described in Example C, above.

EXAMPLE 5

Preparation of polyimide by thermal conversion and having 0.25 weight percent $BaSO_4$. Equal weight parts of polyamide acid as prepared in Example A, above, and in Example 3, above, were combined and used to make polyimide as described in Example B, above.

EXAMPLE 6

Preparation of polyimide by chemical conversion and having 0.25 weight percent $BaSO_4$. The polyamide acid combination of Example 5, above, was used to make polyimide as described in Example C, above.

Results of tests conducted on films of the above examples are presented in Table I.

TABLE I

| Example | $BaSO_4$ (%) | Slide Angle Slip | LOI | Ash |
|---|---|---|---|---|
| B (Control) | 0 | 60+ | 36 | Present |
| C (Control) | 0 | 60+ | 36 | Present |
| 1 | 1 | 26 | 26 | None |
| 2 | 1 | 23 | 26 | None |
| 3 | ½ | 27 | 27 | None |
| 4 | ½ | 23 | 27 | None |
| 5 | ¼ | 29 | 28 | None |
| 6 | ¼ | 25 | 28 | None |

The films of Examples B, C and 1–6 were all about 0.041 to 0.046 millimeter thick. The results of the tests demonstrate that the $BaSO_4$ additive significantly reduces the slide angle slip, reduces the LOI of polyimide film materials, and more importantly, substantially eliminates ash as a combustion product.

EXAMPLE 7

Comparison of the polyimide of this invention with polyimide containing other additive materials. Polyamide acid was prepared as described in Example A, above, with the exception that an amount of finely divided additive material was added to the ODA-DMAC solution before addition of the PMDA. Various amounts of several additives were used to make polyimide films and those films were tested and compared with films of this invention made and tested under the same conditions. The films were all about 0.025 micrometer thick and were made using the procedure described in Example B, above. Results of tests conducted on the films of this Example 7 are presented in Table II.

TABLE II

| Additive Material | Wt. % | LOI (x) | Ash |
|---|---|---|---|
| alumina | 0.7 | $35 < x < 38$ | Present |
| calcium pyrophosphate | 1.0 | $32 < x < 35$ | Present |
| silica | 0.7 | $35 < x < 38$ | Present |
| $BaSO_4$ | 0.3 | $28.2 = x$ | None |
|  | 0.7 | $27.1 = x$ | None |
|  | 1.2 | $26.9 = x$ | None |
| None (Control) | 0 | 36 | Present |

The results of the tests demonstrate that the $BaSO_4$ additive is the only additive in the tests which reduces the LOI of the polyimide. Moreover, it was noted that all film samples of these tests except those having $BaSO_4$ additive burn with a flame and leave an ash of significant volume and substantial electrical conductivity. The polyimide of this invention burns with a uniform front without leaving an ash residue. Similar tests with boron nitride and carbon black as the additives resulted in polyimide with LOI greater than the LOI for additive-free polyimide.

I claim:

1. A shaped article comprising a continuous matrix of polyimide and 0.1 to 10 weight percent of barium sulfate substantially homogeneously distributed throughout the matrix wherein the barium sulfate is in finely divided form with an average particle size of 0.2 to 20 micrometers.

2. The article of claim 1 wherein the polyimide is the product of reaction between a dianhydride and a diamine.

3. The article of claim 2 wherein the shaped article is a film or sheet.

4. The film or sheet of claim 3 wherein the limiting oxygen index is less than 35 percent.

5. The film or sheet of claim 3 wherein the limiting oxygen index is less than 32 percent.

6. The article of claim 1 wherein the shaped article is a film or sheet.

7. The film or sheet of claim 6 wherein the limiting oxygen index is less than 35 percent.

8. The film or sheet of claim 6 wherein the limiting oxygen index is less than 32 percent.

9. The article of claim 1 wherein the shaped article burns with substantially ash-free combustion products.

* * * * *